March 22, 1938. G. A. PAGE 2,111,804
CONTROL MEANS FOR AIRCRAFT WITH ROTATIVE WINGS
Filed Oct. 31, 1936 2 Sheets-Sheet 1
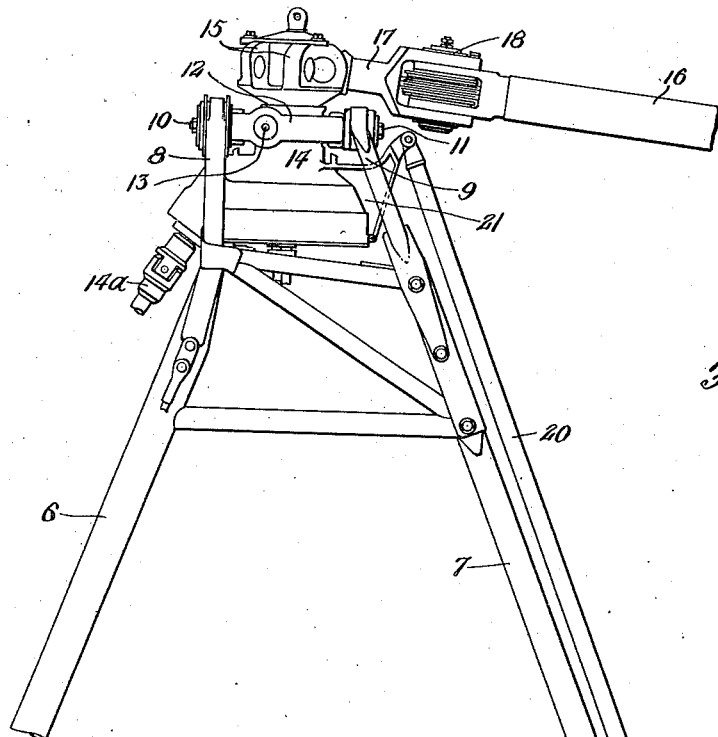
Fig. 1.
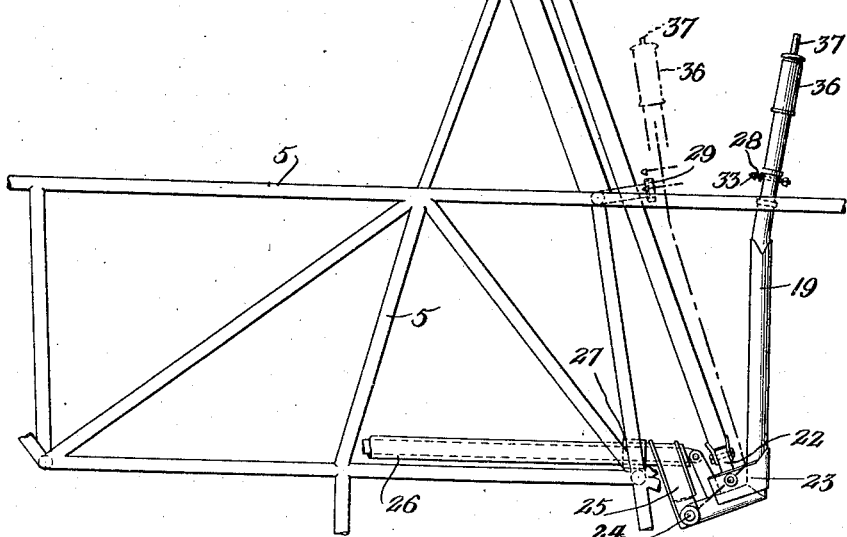
INVENTOR
George A. Page
BY
Synnestvedt + Lechner
ATTORNEYS

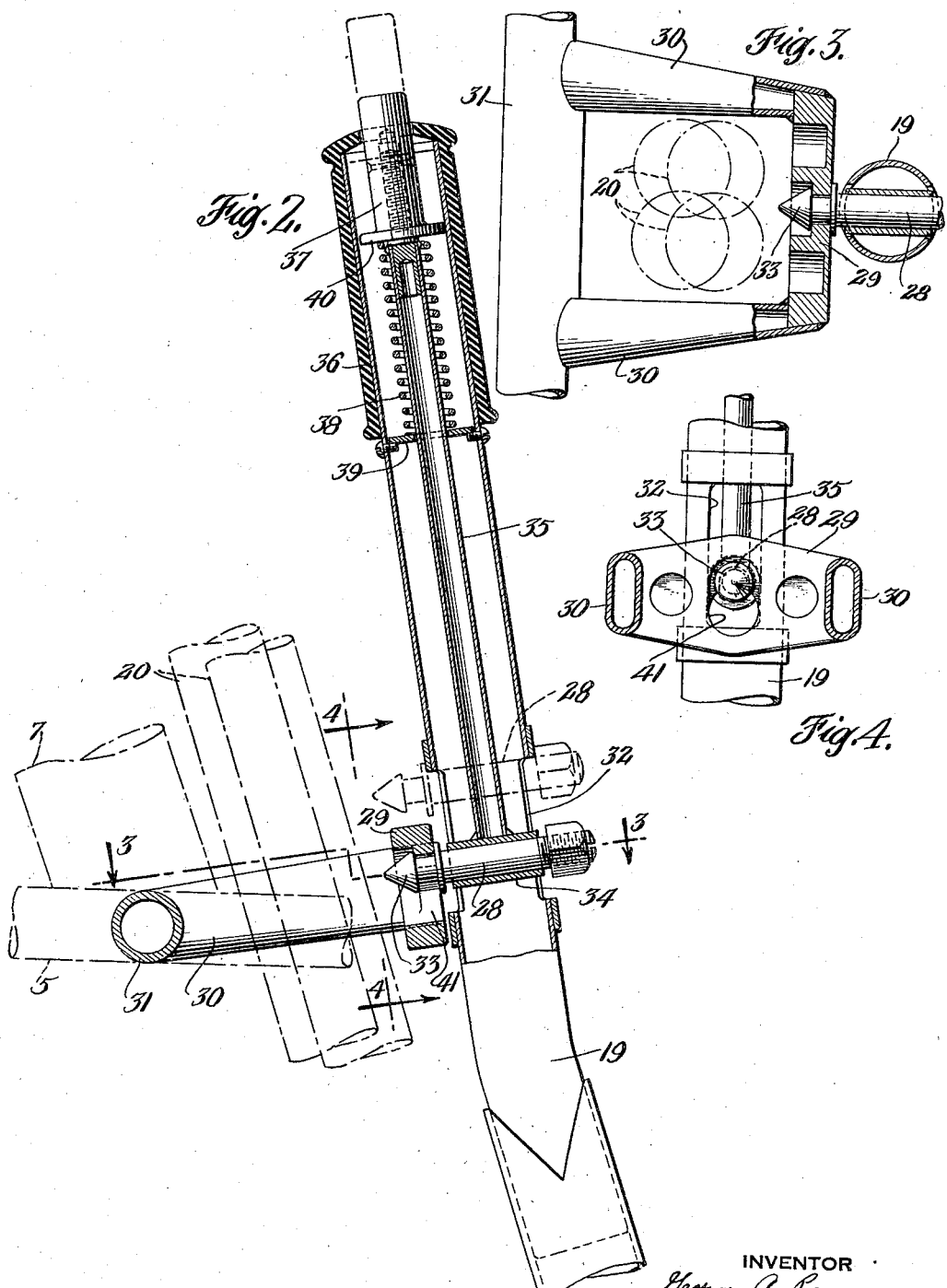

Patented Mar. 22, 1938

2,111,804

UNITED STATES PATENT OFFICE 2,111,804

CONTROL MEANS FOR AIRCRAFT WITH ROTATIVE WINGS

George A. Page, Philadelphia, Pa., assignor to Autogiro Company of America, Willow Grove, Pa., a corporation of Delaware Application October 31, 1936, Serial No. 108,542

7 Claims. (Cl. 244—83)

This invention relates to control means for an aircraft with rotative sustaining wings mounted to permit shifting of the lift line thereof with respect to the center of gravity of the craft to effect control in flight, and the invention is particularly concerned with a releasable latch mechanism adapted to retain the primary control member or stick in a position such that the lift line of the rotor extends downwardly in its rearmost position with respect to the center of gravity.

One of the principal objects of the invention is the provision of a latch device for the purpose referred to above, which device is readily operable at will and which, at the same time, is normally maintained in inoperative condition, so as substantially to eliminate any opportunity for unintentional latching or locking of the control stick in flight.

According to the invention the latch parts are so arranged that the control stick will be held thereby in such position that the rotor lift line is located in its rearmost position with respect to the center of gravity. Preferably, this position of the stick locates the lift line substantially vertically when the craft is at rest on the ground, whereby the blades of the rotor are properly positioned for taxiing and for initiating rotation of the rotor when preparing to take off.

In general, the invention has in view further objects such as novel and simple arrangement of parts, and ease of operation of the latch mechanism including arrangement for operation by one hand, i. e., operation by the hand normally used by the pilot to move the control stick, thus leaving the other hand free to manipulate other controls such as the rotor starter clutch or the rotor brake.

How the foregoing, together with other objects and advantages are obtained, will be apparent from a consideration of the following description referring to the accompanying drawings, in which—

Figure 1 is a side elevational view of portions of the fuselage framing, the pylon, the rotor hub and certain control parts, of the craft provided with the improved mechanism of this invention;

Figure 2 is a view chiefly in vertical section of a control stick and the associated latch mechanism;

Figure 3 is a sectional view taken substantially as indicated by the line 3—3 on Figure 2; and Figure 4 is a sectional view taken as indicated by the line 4—4 on Figure 2.

Fuselage framing elements are shown in Figure 1 at 5. The rotor supporting pylon includes posts 6 and 7 extended upwardly from the fuselage framing and terminating at their upper ends in members 8 and 9 having apertures to receive aligned bearing trunnions 10 and 11, which trunnions are mounted on the ring 12 in turn having apertures to receive trunnions, one of which is shown at 13, which latter are mounted on the rotor hub 14. This assembly provides freedom for tilting of the rotor hub as a whole laterally about the axis of trunnions 10 and 11 and fore and aft about the axis of trunnions 13. Projecting from the top of the hub 14 is a fitting provided with pairs of spaced and apertured lugs 15 to which the several blades of the rotor are pivotally attached. One such blade appears toward the right in Figure 1 at 16, the same being connected with a pair of apertured lugs 15 by means of an extension link 17 and a "drag" pivot 18. The two blade pivots permit freedom for individual swinging movements of the blades in a direction generally transverse the rotative path of travel and in a direction generally within the rotative path of travel.

For the purpose of initiating rotation of the rotor in preparation for take-off, a power transmission between the propulsion engine for the craft and the rotor hub is preferably employed, a fragment of this transmission being indicated at 14a in Figure 1.

A control stick 19 is provided in the body of the craft and this stick constitutes the primary control for maneuvering the craft in flight. To effect the control, the stick is coupled to the rotor hub 14 by connections including the push-pull tube 20 fastened at its upper end to bracket 21 carried on the hub, and at its lower end, by means of joint parts 22 to a bracket 23 carried adjacent the lower end of the stick 19. The stick 19 is pivoted at 24 to a member 25 which is secured to the torque tube 26, and upon fore and aft movement of the control stick about the pivot 24 the push-pull tube 20 will cause a corresponding fore and aft tilting of the hub 14 about the axis of the trunnions 13.

The torque tube 26 is mounted in suitable bearings, as indicated for example at 27, so that the stick 19 may be angularly displaced laterally in either direction, and this torque tube is coupled by other control connections (not shown) with the rotor hub so as to provide for tilting of the latter about the axis formed by the trunnions 10 and 11.

The control stick 19 is equipped with a latch part 28 which is adapted to cooperate with a fixed latch part 29, as will be brought out hereinafter, but before considering the specific nature of this latch mechanism it is pointed out that as a result of movement of the control stick, and the consequent movement of the rotor, the lift line of the rotor is controllably shifted to different positions with respect to the center of gravity of the craft. This serves the purpose of controlling the machine in flight. When the machine is at rest on the ground, however, it is desirable to retain the rotor in a position in which the lift line is approximately vertical, this in order to avoid unintentional take-off at times when the rotor is being started or retarded, and further in order to avoid tilting-over of the machine in gusty air and, finally (with the tilting arrangement of hub as described above), in order to maintain the blades in a position to clear the ground, empennage, or propeller.

In accordance with the present invention a latch mechanism is provided and arranged to hold the control stick in a position such that the rotor lift line will extend approximately vertically, as aforesaid, so that the machine may freely be taxied on the ground without danger of the blades striking either the ground or parts of the craft, and without danger of unintentional take-off, for example during initiating rotation of the rotor just prior to take-off. The specific nature of the embodiment of the latch mechanism herein illustrated will best be understood from an inspection of Figures 2 to 4 inclusive. As here seen, the fixed latch member 29 is mounted by means of a pair of posts 30 projecting rearwardly from a framing element 31 of the fuselage. Posts 30 and member 29 (as best seen in Figure 3) are of such size as to accommodate all necessary movements of the push-pull tube 20 in a horizontal direction, the limits of movement being indicated in dot-and-dash lines in Figure 3. In addition to performing its function as a catch or latch part, the member 29 also, because of its location with reference to the control stick 19 and the tube 20, serves as a stop to prevent movement of the control stick against the tube 20.

At a point spaced downwardly from the extreme upper end of the control stick 19, this stick is cut away as shown at 32 so as to pass the opposite ends of the latch part 28, the forward end of which is formed with a shouldered terminal 33 adapted to interengage with the fixed latch 29. The movable latch 28 is carried in a sleeve 34 to which a tube 35 is coupled, the latter extending upwardly into the hand grip portion 36 of the stick. At its extreme upper end the tube 35 carries a manually operable push button 37 which projects through the upper end of the stick. A spring 38 acting in compression between the ring 39 and flange 40 formed on the element 37 serves to normally urge the tube 35 to its upper position, in which upper position, as seen in Figure 2, the latch part 28 is displaced upwardly above the fixed catch 29 so that even upon movement of the control stick to an extreme forward position, the two latch parts will not interengage.

By virtue of these structural features, the movable latch 28 will only be effective to engage the fixed catch 29 when the member 37 projecting from the top of the hand grip is depressed sufficiently to bring the head or terminal 33 of the movable latch into registry with the opening 41 of the fixed catch.

In operation, therefore, the possibility of unintentional actuation of the catch in normal flight is virtually eliminated, it being pointed out that a positive act on the part of the pilot is necessary in order to condition the latch for operation. However, the latch is readily accessible, even by the same hand with which the pilot controls the stick, so that in making a take-off or a landing, the control stick may quickly be released or fastened.

I claim:—

1. For an aircraft having a sustaining rotor arranged to provide for shifting of the lift line thereof with respect to the center of gravity of the craft, and having a pilot's control member connected with the rotor for controllably shifting the lift line to maneuver the craft in flight, a releasable latch device for holding the control member in a position in which the lift line of the rotor is in its rearmost position with respect to the center of gravity, means for rendering the latch inoperative and for retaining the latch in inoperative condition, and means carried by the control member for conditioning the latch for operation.

2. For an aircraft having a sustaining rotor arranged to provide for shifting of the lift line thereof with respect to the center of gravity of the craft, and having a pilot's control member connected with the rotor for controllably shifting the lift line to maneuver the craft in flight, the pilot's control member having a hand grip portion, a releasable latch device for holding the control member in a position in which the lift line of the rotor is in its rearmost position with respect to the center of gravity, means for rendering the latch inoperative and for retaining the latch in inoperative condition, and means carried by the control member for conditioning the latch for operation, including an operating member projecting from the hand grip portion of the control member for manual operation by the pilot.

3. For an aircraft having a sustaining rotor arranged to provide for shifting of the lift line thereof with respect to the center of gravity of the craft, and having a pilot's control member connected with the rotor for controllably shifting the lift line to maneuver the craft in flight, and a latch mechanism including interengageable parts respectively carried by the control member and by a relatively fixed part of the craft for holding the control member in a position in which the lift line of the rotor is substantially vertical when the craft is at rest on the ground, one of said parts being normally yieldingly displaced to a position such that upon movement of the control member to the position aforesaid the cooperating parts will not interengage, and means carried by the control member for moving the normally displaced part into position to interengage with the other latch part.

4. For an aircraft having a sustaining rotor arranged to provide for shifting of the lift line thereof with respect to the center of gravity, and having a pilot's control member connected with the rotor for controllably shifting the lift line to maneuver the craft in flight, a latch mechanism for holding the control member in the position in which the lift line of the rotor is substantially vertical when the craft is at rest on the ground, said mechanism including a movable latch part carried by the control member, and a cooperating fixed latch part mounted on a relatively non-movable part of the craft, the first part being movably mounted to a position out of registry with the fixed part, means normally urging the movable part to said last position, whereby the control member may be moved to its position first mentioned without operation of the latch mechanism, and manually operable means for moving the first latch part into position to register and engage with the fixed part upon movement of the control member to its position first mentioned.

5. For an aircraft having a sustaining rotor arranged to provide for shifting of the lift line thereof with respect to the center of gravity of the craft, and having a pilot's control member of the pivotally mounted type connected with the rotor for controllably shifting the lift line to maneuver the craft in flight, a pair of cooperating latch parts, one mounted on the control stick and the other mounted on a relatively fixed part, the two latch parts being interengageable by snap-latch action when the control stick is moved to a position in which the lift line of the rotor is substantially vertical with the craft at rest on the ground, one of the latch parts being normally yieldingly displaced to a position out of registry with the other, whereby the control stick may be moved to said position without interengagement of the latch parts, and means for relatively moving the latch parts into interengaging positions so that upon movement of the control stick to the position aforesaid the latch parts will interengage and retain the control stick in position with the lift line of the rotor substantially vertical.

6. For an aircraft having a sustaining rotor arranged to provide for shifting of the lift line thereof with respect to the center of gravity of the craft, and having a pilot's control member of the pivotally mounted type connected with the rotor for controllably shifting the lift line to maneuver the craft in flight, a pair of cooperating latch parts, one mounted on the control stick and the other mounted on a relatively fixed part, the two latch parts being interengageable by snap-latch action when the control stick is moved to a position in which the lift line of the rotor is substantially vertical with the craft at rest on the ground, one of the latch parts being normally yieldingly displaced to a position out of registry with the other, whereby the control stick may be moved to said position without interengagement of the latch parts, and means carried by the control stick for relatively moving the latch parts into interengaging positions so that upon movement of the control stick to the position aforesaid the latch parts will interengage and retain the control stick in position with the lift line of the rotor substantially vertical.

7. For an aircraft having a sustaining rotor arranged to provide for shifting of the lift line thereof with respect to the center of gravity of the craft, and having a pilot's control member of the pivotally mounted type connected with the rotor for controllably shifting the lift line to maneuver the craft in flight, the control member having a hand grip portion for manual operation, a releasable latch device for holding the control member in a position in which the lift line of the rotor is in its rearmost position with respect to the center of gravity, means for rendering the latch inoperative and for retaining the latch in inoperation condition, and a device for conditioning the latch for operation, said device being carried by the control member and projecting from the control member above the hand grip portion thereof in position for thumb actuation.

GEORGE A. PAGE.